April 20, 1965  G. W. EK ETAL  3,179,115
WASHING APPARATUS FOR GLASSES AND OTHER ARTICLES
Filed Aug. 31, 1962  4 Sheets-Sheet 2
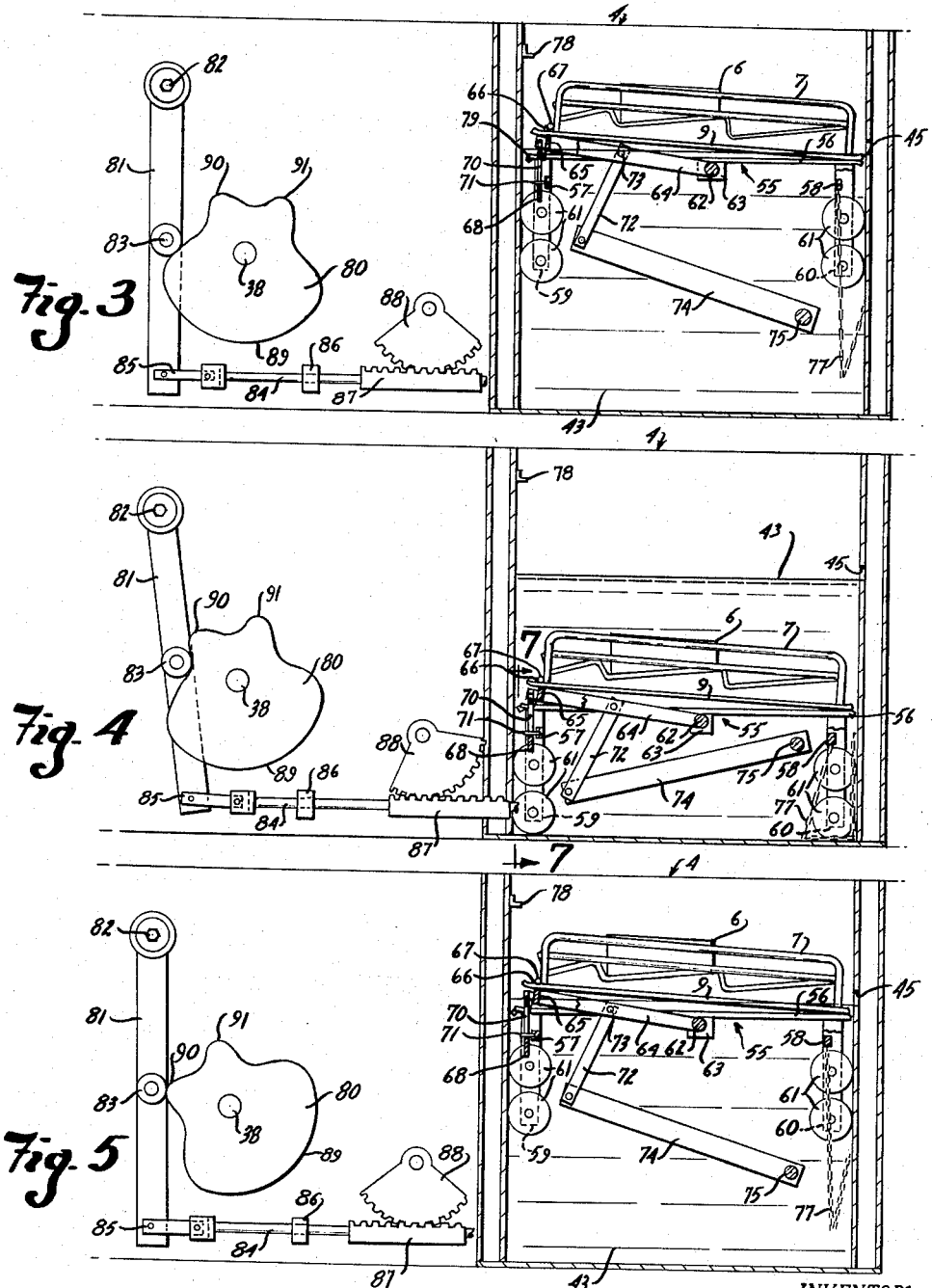
INVENTORS
GEORGE W. EK
HENRY M. LEISNER
BY
Andrus & Starke
Attorneys April 20, 1965        G. W. EK ETAL        3,179,115
WASHING APPARATUS FOR GLASSES AND OTHER ARTICLES
Filed Aug. 31, 1962        4 Sheets-Sheet 3
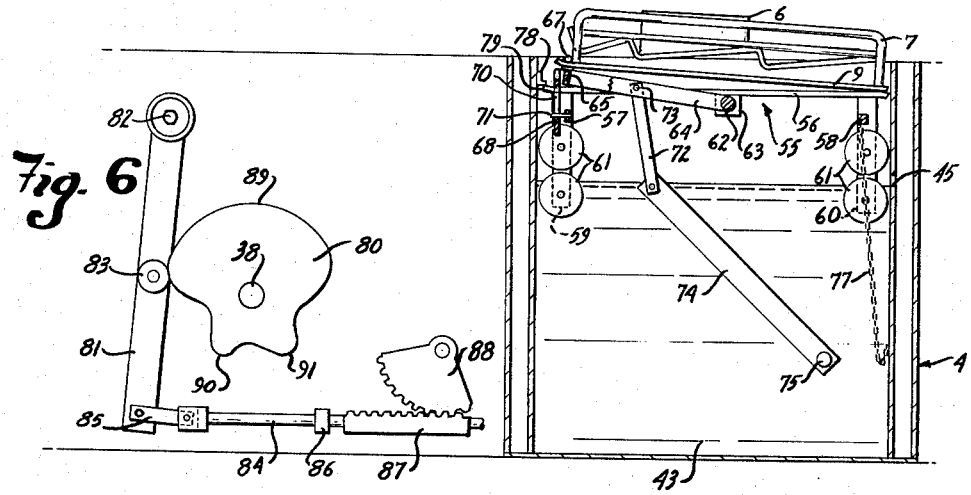
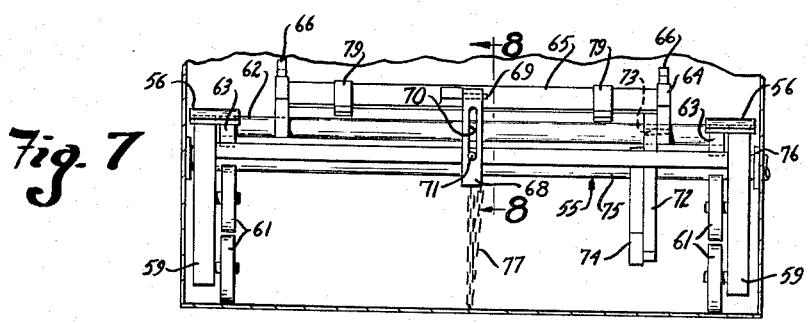
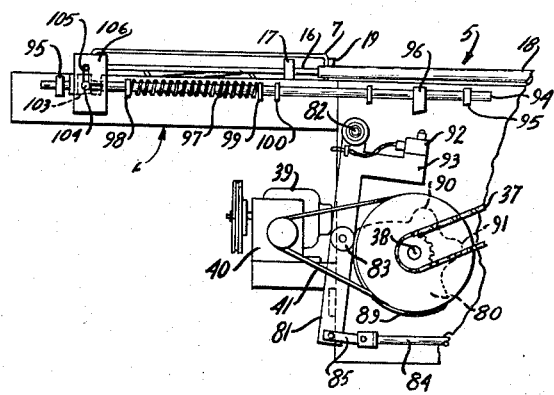
INVENTORS
GEORGE W. EK
HENRY M. LEISNER
BY
*Andrus & Starke*
Attorneys 3,179,115
WASHING APPARATUS FOR GLASSES AND
OTHER ARTICLES
George W. Ek, 5510 N. 34th St., Milwaukee, Wis., and
Henry M. Leisner, Menominee Falls, Wis.; said Leisner
assignor to said Ek
Filed Aug. 31, 1962, Ser. No. 220,620
12 Claims. (Cl. 134—46)

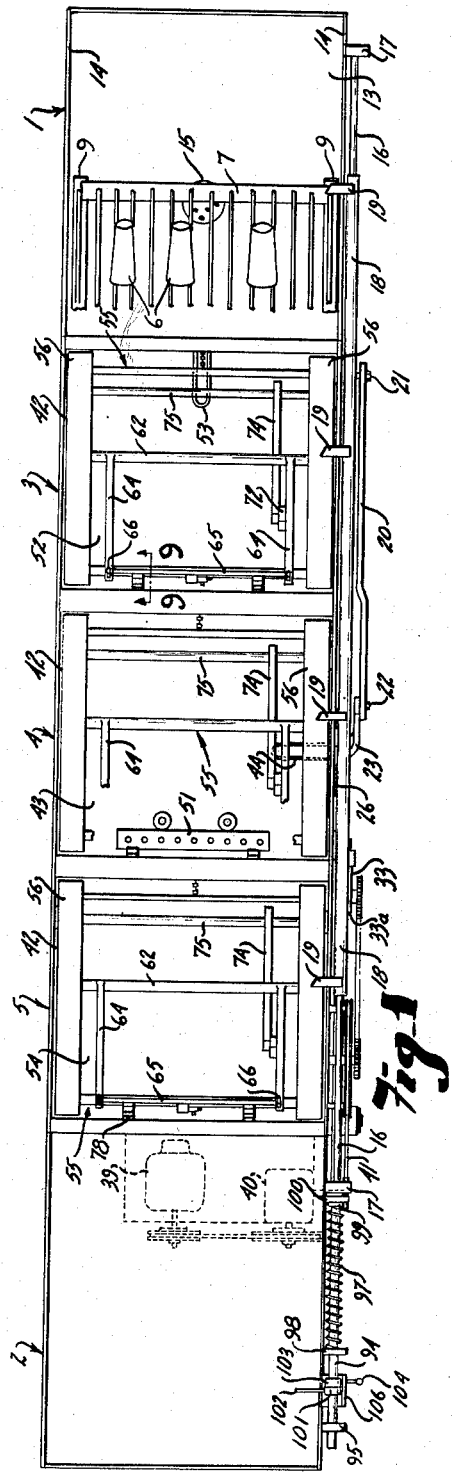

This invention relates to a washing apparatus and is more particularly directed to an automatic washing unit of the soaker or immersion variety.

Generally, present day automatic dish and glass washing machines are of the spray variety wherein hot water is continuously circulated over the dishes or articles to be washed and cleansed. Immersion or soaker type washing units wherein the articles are immersed for a predetermined period within a washing solution are generally hand operated. For example, in dining establishments the glasses are often washed by manually immersing the glasses and the like in a wash solution and then manually transferring them into rinse water and the like.

One of the primary problems in soaker type washing units is preventing the floating of glasses and similarly shaped articles. Thus, if a glass is disposed in the solution with the open end down, air may be trapped in the glass causing the glass to float in the solution. If the glass is inserted closed end down, the buoyant effect holds the glass up and the glass must be positively immersed to introduce solution into the glass which holds the glass immersed.

Another serious problem, particularly in connection with soaker type units employing a conventional alkali solution, results from the fact that a film tends to form on the glasses giving the glasses a cloudy appearance if they are allowed to stand in air after immersion in the solution. Consequently, it is important that the glasses be rinsed immediately after being removed from an alkali solution.

The present invention provides an automatic soaker type washing unit having a series of stations for automatically washing glasses and/or other articles suitably supported for successive immersion at the several stations. While the apparatus of this invention is particularly suited for washing of glasses and is described accordingly herein, the apparatus is, of course, applicable for washing of dishes and other articles as well.

According to this invention, an immersion or soaker type washer includes a plurality of immersion stations intermediate a loading station and an unloading station. The articles to be washed are placed on carrier means which are advanced by transfer means between successive stations during the washing operation. At each immersion station a vertically movable support means receives the carrier means from the transfer means and immerses the carrier means with the articles therein. The drive means for the transfer means and the vertically movable support means perform in timed relation to provide a fully automatic washing operation from the loading station to the unloading station of the washer.

The drawings furnished herewith illustrate the best mode presently contemplated for carrying out the invention.

In the drawings:

FIG. 1 is a top plan view of a multi-station soaker or immersion type washing apparatus constructed in accordance with the present invention;

FIG. 2 is an elevational view of the multi-station washing apparatus of this invention with parts broken away and sectioned to show a vertically moving carriage at one of the immersion stations and in phantom shows the actuation of means for horizontally advancing the trays of articles being washed between stations;

FIG. 3 is an enlarged sectional view with parts broken away of one of the immersion stations with the carriage therein shown moving downwardly and further shows schematically the drive means for the carriage in the corresponding position;

FIG. 4 is a view similar to FIG. 3 with the carriage shown generally in its lowermost position;

FIG. 5 is a view similar to FIG. 3 with the carriage shown generally at the top of an agitation stroke;

FIG. 6 is a view similar to FIG. 3 with the carriage moving upwardly and approaching the uppermost position;

FIG. 7 is a fragmentary view taken generally on line 7—7 of FIG. 4 with the tray removed;

FIG. 10 is a fragmentary elevational view showing the unloading station;

Figure 11:
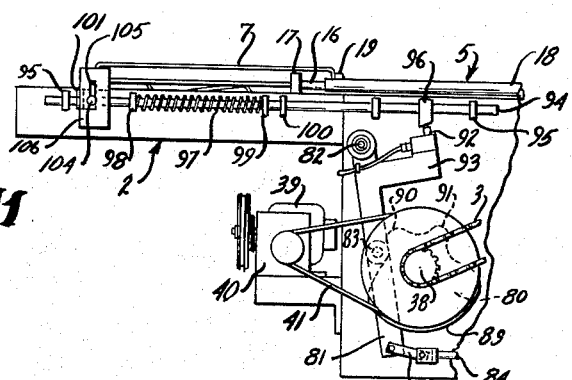
FIG. 11 is a view similar to FIG. 10 and shows the action of the interlock for stopping the washing unit when a tray is not timely removed from the unloading station.

Referring to the drawings, and particularly to FIGS. 1 and 2, the automatic soaker or immersion type washer of this invention includes a plurality of stations disposed in sequence with a loading station 1 at one end and an unloading station 2 at the opposite end. Intermediate the loading and unloading stations are a series of immersion stations 3, 4 and 5 which as a matter of convenience may be designated a soaking station, a washing station and a rinsing station respectively. The articles to be washed such as glasses 6 are disposed on a supporting tray 7 which is initially placed in the loading station 1. From the loading station 1, the tray 7 is automatically moved through the cycle of operation moving successively through the soaking station 3, washing station 4, rinsing station 5 and is thereafter deposited in the unloading station 2 to await removal.

Ordinarily the soaking, washing and rinsing stations 3, 4 and 5 respectively of the apparatus will be enclosed within a suitable enclosure or casing, not shown, to protect the operator and provide an attractive unit.

Figure 12:
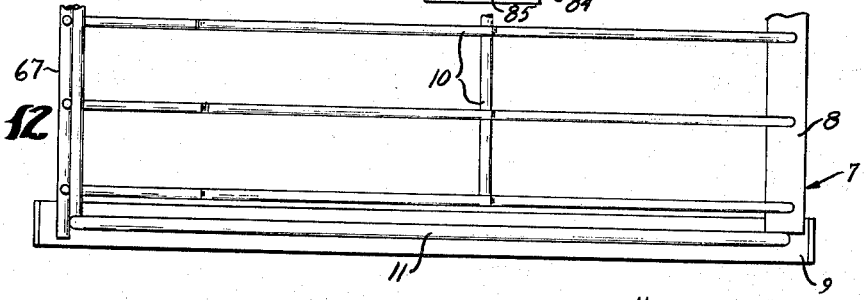
FIG. 12 is an enlarged fragmentary top plan view of a tray for supporting glasses as used in the washing apparatus of this invention.
Figure 13:
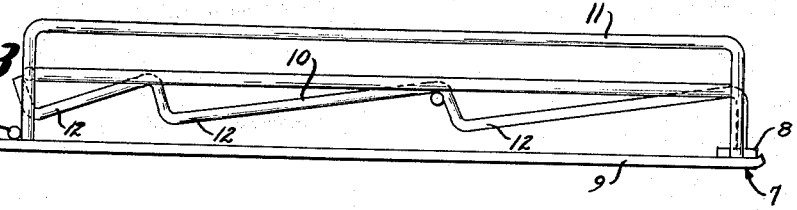
FIG. 13 is a side elevational view of the glass supporting tray.

As shown most clearly in FIGS. 12 and 13, the supporting tray 7 for carrying glasses 6 is generally of an open type having a base 8 provided with runners 9 extending longitudinally in the direction of movement of the tray. The base 8 carries a mesh structure 10 and suitable handling rails 11 fabricated of wire-like members coated with an alkali resistant rubber-like material. The mesh structure 10 is formed with a series of longitudinally spaced slanting steps 12 each of which slants forwardly and downwardly with respect to the direction of movement of the tray.

The glasses 6 may be placed in the tray 7 at a location removed from the machine or in a tray already placed in loading station 1 and are disposed longitudinally on the slanting steps 12 with the open end facing forwardly and abutting against the generally vertical shoulder between adjacent steps. In the loading station 1 wherein the runners 9 of tray 7 are disposed generally horizontally liquid and other foreign matter in the glasses 6 can drain from the glasses and is disposed of through a suitable waste drain.

Referring to FIGS. 1 and 2, the loading station 1 is shown as an overhanging structure having a generally horizontal base 13 which is adapted to support a tray 7. Opposed side railings 14 define the supporting area of base 13 which is somewhat wider than the width of the tray 7 to allow ready mounting of trays and at the same time to properly align the tray for movement to the next station from the loading station 1. A drain 15 is provided in the base 13 through which liquid draining from the glasses can be carried to any suitable disposing means.

A drive mechanism for moving the trays between the successive stations 1–5 within the washing unit includes a guide rod 16 which is secured to one side of the washing unit and extends generally between the trailing portion of the loading station 1 to the trailing end of the unloading station 2. The guide rod 16 is immovably mounted between suitable end supports 17 and slidably carries a tubular sleeve 18 journaled on the rod 16 for movement longitudinally of the washing unit. Four push arms 19 are fixedly attached to the tubular sleeve 18 and are axially spaced in accordance with the distance between the several stations of the washing unit. The arms 19 project laterally over the respective stations and are adapted to engage the trailing end of a tray 7 and push the engaged tray to the next succeeding station.

The tubular sleeve 18 is actuated by a drive linkage including a generally horizontally extending link 20 which is pivotally secured at one end to sleeve 18 at 21. The opposite end of the horizontal link 20 is pivotally connected at 22 to the upper end of a generally vertically crank arm 23. The lower end of crank arm 23 is carried on pivot shaft 24 journaled in a suitable boss which projects outwardly from the outside wall of the washing unit. The pivot shaft 24 also carries a gear element 25 fixedly secured thereto and drivingly meshes with a generally horizontally disposed gear rack 26. A roller 27 journaled upon a roller shaft 28 projecting outwardly from the wall of the washing unit directly beneath pivot shaft 24 supports the end portion of rack 26 and maintains the rack in meshing engagement with gear element 25. The opposite end of rack 26 is in turn pivotally connected at 29 to the lower free end of a rocker arm 30 and is actuated by the arm in a substantially horizontal plane. Movement of rack 26 rearwardly by arm 30 rotates the gear element 25 and pivots shaft 24 to actuate the crank arm 23 and effect thereby forward movement of sleeve 18 to advance trays 7 engaged by the push arms 19. Sleeve 18 is returned to its initial position by return movement of rack 26 as effected by rocker arm 30.

The rocker arm 30 is pivotally supported at its upper end on shaft 31 projecting from the wall of the washing unit and carries a roller cam follower 32 intermediate its length. Pivotal movement of the rocker arm 30 is controlled by cam 33 rotatably mounted upon cam shaft 34 for engagement with the cam follower 32. A tension spring 35 disposed between rocker arm 30 and a fixed stop 36 biases the arm toward cam 33 to maintain engagement between the cam and its follower 32.

The cam 33 rotates in a counterclockwise direction as viewed in FIG. 2 and includes a generally semi-circular dwell surface 33a at a relatively short radius from shaft 34. When surface 33a is engaged by follower 32, rocker arm 30 remains substantially stationary. Cam 33 further includes a radially projecting lobe providing an arm actuating surface 33b and an arm return surface 33c which extend generally tangentially to dwell surface 33a. Intermediate the lobe surfaces 33b and 33c, the lobe is provided with a dwell surface 33d which maintains arm 30 and sleeve 18 in the advance drive position for a period of time to be explained hereinafter.

Cam 33 is driven by a conventional chain drive assembly 37 connecting cam shaft 34 and the cam shaft 38 which controls the vertical movements for trays 7 as will be explained hereinafter, to provide a synchronous drive for controlling both the horizontal and vertical movements of the trays 7. The control shaft 38 is driven by an electric motor 39 coupled to a speed reducer 40 through a suitable belt drive 41.

At the beginning of a cycle of operation, sleeve 18 is positioned rearwardly with the four push arms 19 immediately adjacent the trailing end of the respective stations, 1, 3, 4 and 5. When the washing unit is actuated, the sleeve 18 is pulled forwardly as the cam follower 32 on rocker arm 30 climbs the lobe surface 33b of cam 33 to simultaneously move the trays 7 from the loading station 1 and from each of the immersion stations 3, 4 and 5 to the next succeeding station. During the period of time trays 7 are being moved horizontally between stations, the shaft 38 controlling vertical movements of trays 7 within the immersion stations provides for an idle or inactive period as will be explained hereinafter, wherein the several vertically operating components at the respective stations remain stationary. After trays 7 come to rest at the next succeeding station, cam follower 32 of arm 30 is in engagement with the lobe dwell surface 33d of cam 33 causing sleeve 18 to remain stationary in its advanced position. Simultaneously the vertically operating components of the immersion stations 3, 4, and 5 are actuated by control shaft 38 to lower the one or more trays 7 positioned over the immersion stations downwardly out of the path of the lateral push arms 19 as will be explained hereinafter. The trays 7 are lowered below the level of arms 19 at the end of the dwell period provided by lobe surface 33d of cam 33. Cam follower 32 then descends lobe surface 33c of cam 33 as the rocker arm 30 is biased to its return position by tension spring 35 effecting a return of sleeve 18 to its starting position. The horizontal tray moving mechanism is maintained in the position as cam follower 32 rides on dwell surface 33a of cam 33 for the subsequent movement of trays to the next succeeding station following completion of the vertical moving immersion processes.

The immersion stations 3, 4 and 5 are structurally identical in many respects in the illustrated embodiment of the invention. Consequently, the intermediate washing station 4 is described in detail and the soak and rinse stations 3 and 5 respectively are described to the extent necessary to show the structural differences which have been incorporated in the illustrated embodiment of the invention.

The washing station 4 includes a rectangularly-shaped open-topped basin 42 which is just slightly larger than the outer perimeter of tray 7. The top edge of the forward and rear walls of basin 42 is generally in alignment with the base 13 of the loading station so that trays 7 are readily moved between stations. In the washing unit shown which is adapted particularly for washing glasses 6, water is preferred as the washing solution 43. An electric immersion heating unit 44 is secured to the side wall of the basin 42 and projects into the lower portion of the washing solution 43. The immersion heater 44 is connected to a suitable source of power and may be thermostatically controlled to maintain the wash solution 43 at a selected temperature. Normally, the wash solution is preferably maintained at approximately 120° F.

One or more overflow openings 45 are provided in the backwall of the basin 42 at the desired upper level of the washing solution 43 and a suitable drain outlet 46 communicates with the overflow opening 45. The level of the overflow openings 45 can be selected to provide that trays 7 containing the articles being washed are moved substantially out of the wash solution during an agitation portion of the cycle of operation as will be described hereinafter. Any sluge or other foreign matter accumulating on the top of the washing solution 43 may be flowed off through openings 45 by the constant addition of a small amount of water from source 47 to maintain the wash solution reasonable clear of floating sludge and foreign matter.

A re-circulation line 48 for the wash solution 43 is connected into the bottom of the basin 42. A pump 49 is inserted in the line 48 to continuously circulate the washing solution through a filter 50 which is serially connected in circulation line 48. The filtered wash solution 43 reenters basin 42 through the elongated distributor 51 providing a degree of constant agitation to the wash solution to assist in the washing process.

For cleansing glasses 6 it is generally desired that basin 42 in soaking station 3 contain an alkali solution 52 maintained at approximately 160° F. by the heating element 53 carried in the back wall of the basin. Because it is generally not desired to have the glasses move out of the soaking solution during the agitation portion of the cycle, the level of the solution is maintained substantially higher than in the basin 42 in station. With glasses 6, sludge formation is ordinarily not a problem in the alkali solution 52, but if desired a recirculating system for the soak solution, not shown, may be provided as for the wash solution 43 in station 4.

The rinse solution 54 in basin 42 of station 5 may be water as in station 4. The final rinse simply assures removal of any possible remaining traces of the alkali soak solution 52. The level of the overflow openings 45 may correspond to those of station 4 so that trays 7 move substantially out of solution during the agitation portion of the cycle and a small amount of fresh water may be constantly added from tap 47. So that the glasses are not unduly warm after final rinsing in station 5 and can immediately be put to use upon removal, heating of the rinsing solution is generally not desired.

A vertically moving carriage 55 for trays 7 is provided within each of the several immersion stations and generally comprises a pair of transversely spaced horizontal strip-like plates 56 disposed within and immediately adjacent to the side walls of the basin 42. In the uppermost position of the carriage, the plates 56 are generally disposed in alignment with the top of the forward and rear walls of basins 42. Plates 56 not only provide a support surface for trays 7 but also serve as tracks for the horizontally moving trays and therefore may be provided with downwardly curved end portions to avoid possible interference with the runners 9 on the trays. Spaced plates 56 are connected by transversely extending forward and aft cross-braces 57 and 58 which respectively extend between generally transversely aligned and spaced forward and aft mounting brackets 59 and 60 depending from the undersurface of the respective plates. A pair of vertically aligned guide wheels 61 are rotatably mounted from the depending mounting brackets 59 and 60 to engage with the front and rear walls of basin 42 to thereby maintain the carriage 55 in a generally horizontal position during its vertical movements within basin 42.

The respective carriages 55 include a tray tilting mechanism for engaging and lifting the forward ends of trays 7 upwardly out of engagement with plates 56 for appropriate periods during vertical movements of the carriage. The tilting mechanism pivots on the axis of shaft 62 which extends transversely beneath plates 56 generally centrally of the carriage 55 and is journaled at its opposite ends in suitable transversely aligned bearings 63 secured to the under side of the plates 56. A pair of laterally spaced arms 64 are fixedly secured to the shaft 62 between the plates 56 and project forwardly over the carriage front cross-bar 57. Forwardly the ends of the arms 64 are connected by a cross-bar 65 so that the arms pivot as a unit with shaft 62. Aligned tray engaging projections 66 are carried on the upper surface at the forward end of the respective arms 64 and are suitably grooved to receive the forward cross-rod 67 provided on the trays 7.

Figure 9:
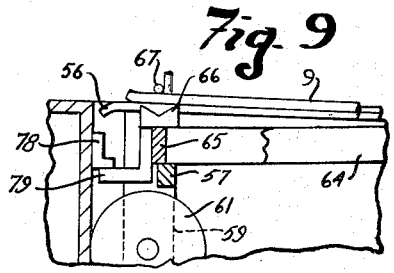
FIG. 9 is a fragmentary detail taken generally on line 9—9 of FIG. 1 with the carriage approaching its uppermost position.

As most clearly shown in FIGS. 7 and 9, an element 68 is pivotally supported on pin member 69 from the cross-bar 65 generally centrally between arms 64 and extends vertically downwardly in front of the forward cross-bar 57 of carriage 55. A vertically extending slot 70 provided in element 68 engages with a horizontal pin 71 which extends forwardly from the cross-bar 57. The arms 64 may, therefore, be angularly displaced with respect to the carriage 55 as provided for by the slot 70. In the lowermost position of tilt arms 64 the pin 71 is out of contact with the lower edge of slot 70 and the grooved tray engaging projections 66 are generally disposed below and out of contact with the tray cross-rod 67 so that the full length of the tray runners 9 rest squarely on plates 56.

With the arms 64 tilted upwardly and the lower end of slot 70 engaging with the pin 71, the grooved projections 66 extend above the plates 56 and engage the tray cross-rod 67 to raise the forward end of the tray 7 upwardly from plates 56 as shown in FIGS. 3–6. The amount of angular displacement of arms 64 is selected to provide that the forward open ends of glasses 6 carried by the tray are disposed in a substantially vertical plane. With the glasses so disposed upon entering the immersion solutions, the solution will enter the glasses as they are immersed in a manner to prevent entrapment of air within the glasses.

The drive mechanism for actuating the carriage 55 vertically in basin 42 includes the linkage member 72, one end of which is pivotally secured generally centrally of the length of one of the arms 64 at 73. The opposite end of linkage member 72 is pivotally secured to the end of a crank arm 74 carried by a drive shaft 75 which extends laterally through the basin 42 and is journaled within suitable sealed bearings 76 in the side walls of the basin. The drive shaft 75 extends outwardly through the side wall of the basin on the drive side of the washing unit and is operatively connected to cam shaft 38 in a manner to be described hereinafter to provide for selective rotation of shaft 75 to pivot the crank arm 74 in a vertical plane within basin 42 and thereby move the carriage 55 together with the tray tilting mechanism vertically within the basin.

To provide for movement of the carriage 55 vertically within basin 42 with relative ease, a small amount of play is provided between the guide wheels 61 and the walls of the basin. This play is utilized to advantage in the uppermost position of carriage 55 to provide the carriage with a slight tilt downwardly toward the rear end thereof placing the forward end of the carriage slightly above the top of the forward basin wall and the rear end of the carriage slightly beneath the top of the rear basin wall to facilitate longitudinal movement of trays onto the carriage from the next preceding station. To effect the desired tilt of the carriage in its uppermost position a chain 77 is secured between the rear cross-brace 58 of the carriage and the rear wall of basin 42. As shown in FIG. 2 the chain 77 is pulled taut to interrupt upward movement of the rear end of the carriage and maintain the same at the desired tilt in the uppermost position. At other times during vertical travel of the carriage chain 77 is collapsed to an out of the way position as variously shown in FIGS. 3–6.

During upward movement of carriage 52 as shown in FIGS. 5 and 6, the drive force of the clockwise rotating crank arm 74 is exerted on the arms 64 so that the forward end of the arms is raised to engage and tilt tray 7 relative to the carriage and the lower end of slot 70 of the tilt mechanism element 68 engages with the carriage pin 71. The carriage is therefore lifted by the tilted arms 64 which exert the upward drive force through the tilt shaft 62 and slotted element 68 respectively.

Figure 8:
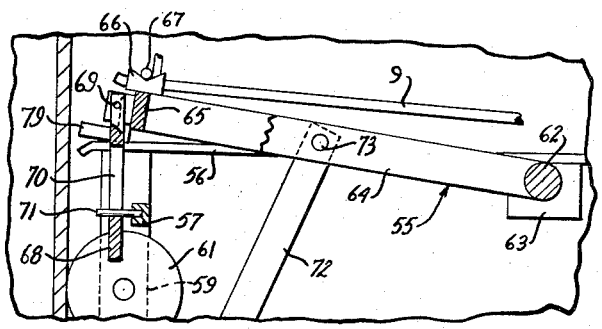
FIG. 8 is a fragmentary detail view taken generally on line 8—8 of FIG. 7 showing details of the vertically moving carriage.

In the uppermost position of carriage 55 as shown in FIG. 2, it is desired that the grooved projections 66 on arms 64 disengage from the tray cross-rod 67 to facilitate horizontal movement of the trays between stations. To effect such disengagement a pair of transversely spaced and horizontally aligned stops 78 are secured to the interior forward wall of the basin 42. As the carriage approaches its uppermost position with the arms 64 tilted with respect to the carriage, the stops 78 are engaged by corresponding L-shaped lugs 79 provided on the crossbar 65 joining arms 64 as shown most clearly in FIGS. 6 and 8. After upward movement of the forward ends of arms 64 is arrested, the arms 64 continue to apply an upward drive force through the tilt shaft 62 to further raise the carriage and thereby effect the disengagement between the grooved projections 66 and the tray cross-rod 67 permitting the tray 7 to rest full length on plates 56. In the uppermost position of the carriage, the weight of the carriage rests solely on the tilt shaft 62.

As the carriage 55 approaches the uppermost position and the tilt arms 64 lower the forward end of tray 7 relative to plates 56, the glasses 6 carried by the tray reassume the angle provided by slanting steps 12 of the tray to provide for complete drainage into the basin 42 from which the tray just emerged. With the tray 7 resting squarely full length on plates 56 in the uppermost position of carriage 55, the tray is also in position for movement to the next succeeding station.

With counterclockwise rotation of the crank arm 74 to move the carriage downwardly from its uppermost position, the arms 64 again assume the tilted position to tilt the tray 7 as the arms 64 are pulled downwardly and the weight of the carriage is borne solely on the tilt shaft 62. After the arms 64 and tray 7 assume the fully tilted position relative to the carriage, the carirage pin 71 reengages the lower end of slot 70 of the tilt mechanism element 68 so that the weight of the carriage is again distributed between the slotted element 68 and the tilt shaft 62. With the weight of the carriage so distributed the arms 64 and the tray 7 will maintain their tilted position as the crank arm 74 continues to exert a downward force on arms 64 as shown in FIG. 3.

From the foregoing discussion it will be evident that arms 64 and trays 7 are tilted relative to the carriage 55 at all times when moving vertically either up or down within the basin 42. It is only at or near the uppermost position of the carriage that the tray assumes an untilted position and rests squarely full length on the plates 56.

The several drive shafts 75 in the immersion stations 3–5 are simultaneously and correspondingly driven by the control cam 80 carried on shaft 38. The cam 80 controls the movements of arm 81 which is pivotally mounted on shaft 82 projecting outwardly from the wall of the washing unit above cam 80. The arm 81 extends vertically downwardly adjacent to cam 80 and carries a roller cam follower 83 which is adapted to bear against the cam. The arm 81 actuates a relatively long reciprocating drive rod 84 through the connecting link 85 which is pivotably secured to the terminal end of arm 81 and the drive rod respectively. The drive rod 84 extends generally coextensively and longitudinally of the immersion stations and beneath the outward extensions of the several drive shafts 75. Drive rod 84 is slidably journaled within suitably spaced bearings 86 to provide for reciprocation of the rod perpendicularly to the axis of the drive shafts 75. Three gear racks 87 are carried by the drive rod 84 and are spaced in accordance with the spacing of the drive shaft 75 for the respective stations 3–5. The respective racks 87 are disposed in similar meshing engagement with corresponding gear sectors 88 fixedly secured on the respective drive shafts 75. Through the respective similarly meshing racks 87 and gear sectors 88, the carriages 55 in the respective immersion stations are similarly and simultaneously moved vertically upon reciprocation of drive rod 84 as controlled by the configuration of the cam 80. The arm 81 is constantly biased to maintain the cam follower 83 in contact with cam 80 by the weight of the several carriages 55 acting through the corresponding drive system.

The cam rotates in a counterclockwise direction as viewed in the several figures and includes a relatively large dwell lobe 89 of maximum radius and a pair of generally similar smaller lobes 90 and 91 of lesser radius. The valleys between the several lobes 89, 90 and 91 of cam 80 are generally of similar depth and when engaged by follower 83 place the carriages 55 at the end of their downward stroke adjacent to the bottom of basins 42 as shown in FIG. 4. It will be observed that in this position of follower 83, the arm 81 and drive rod 84 are in their extreme right position as viewed in the several figures. When the large dwell lobe 89 is engaged by the roller cam follower, the arm 81 and drive rod 84 are in their extreme left position as shown in FIG. 2 and the carriages 55 remain stationary for the period of the dwell in their uppermost position. The smaller lobes 90 and 91 of cam 80 produce relatively rapid vertical reciprocations of the carriages 55 within basins 42 to provide a degree of agitation. As shown in FIG. 5, when the follower 83 engages the crest of lobe 90 or 91, the arm 81 and drive rod 84 are moved to an intermediate position and the carriages 55 reach an intermediate height within the basins. In the case of the wash and rinse stations 4 and 5 respectively the position of intermediate height for carriages 55 as produced by lobes 90 and 91 carry trays 7 substantially out of the solution so there will be still further agitation by reason of reentry of the trays and their contents into the solution.

As indicated hereinbefore, the cams 33 and 80 respectively control the horizontal and vertical movements of trays 7 and are synchronized to provide a fully automatic washing operation. During the period that the larger dwell lobe 89 of cam 80 is in engagement with the follower 83, carriages 55 are maintained in their uppermost position and the trays 7 are advanced to the next succeeding station by movement of sleeve 18 as the cam follower 32 ascends cam surface 33b of cam 33 as shown in FIG. 2. After the trays 7 have arrived at the next succeeding station, the tray moving sleeve 18 remains in the advanced position while cam follower 32 rides over dwell surface 33d of cam 33 and the cam follower 83 proceeds into the valley between the dwell lobe 89 and lobe 90 of cam 80 as shown in FIG. 3, to move the carriages 55 downwardly within the basins 42. After the cam follower 83 has passed through the valley between lobe 89 and lobe 90 of cam 80 and has begun the ascendency of lobe 90, carriages 55 have reached the bottom of their stroke within basins 42 and are moving upwardly on the first of the two agitation reciprocations. While cam follower 83 ascends lobe 90 of cam 80 and the carriages 55 move upwardly within the basins 42, the cam follower 32 moves off of the cam dwell surface 33d and starts the descent of cam surface 33c as the sleeve 18 proceeds with its return stroke. After the cam follower 32 completes the descent of cam surface 33c and sleeve 18 reaches its initial position, follower 32 then proceeds across the relatively long dwell surface 33a during which period the sleeve 18 remains at rest in its initial position in readiness for the next longitudinal shift between stations. While sleeve 18 is making its return stroke and thereafter remains at rest in its initial position, the carriages 55 have proceeded through their vertical agitation reciprocation and are returned to their initial uppermost position as the cam follower 83 passed over the smaller lobes 90 and 91 of cam 80 and has once again mounted the large dwell lobe 89. Subject to the timely removal of trays 7 at the unloading station 2 as will be explained hereinafter, the drive is continuously repetititve without stopping.

If a tray 7 is not timely removed from the unloading station 2, the washing unit is automatically shut off to prevent the consequences of a jam up. This is accomplished by actuation of a normally closed stop switch 92 mounted on the lateral projection 93 on the control arm 81. As most clearly shown in FIGS. 10 and 11, the switch 92 pivots with arm 81 in accordance with rotation of cam 80 controlling the vertical actuation of carriages 55 within the basins 42.

A horizontal rod 94 is slidably disposed in spaced bearings 95 for reciprocation generally above control arm 81 and adjacent the unloading station 2 and in a direction paralleling tray movement. A switch actuator 96 is carried by the reciprocating rod 94 into and out of the path of stop switch 92. A tension coil spring 97 encircles the sliding rod 94 between a fixed stop 98 on the washing unit and a stop collar 99 secured on the rod 94. The coil spring 97 continuously biases the rod 94 toward the input end of the washing unit and a second stop 100 provided on the washing unit and engageable by stop collar 99 establishes the rearmost position of the rod. As most clearly shown in FIG. 2, the switch actuator 96 is removed from the path of switch 92 when the rod is disposed in its rearmost position.

Adjacent the forward end thereof, rod 94 carries a collar 101 from which a tray engaging projection 102 extends laterally through an opening in the side wall of the unloading station 2 and into the path of the trays 7. During the final movement of a tray 7, the projection 102 is engaged by the tray and is pushed forwardly. The projection 102 pulls the sliding rod 94 forwardly with it against the bias of spring 97 and the switch actuator 96 on the rod is carried into the path of switch 92. If the tray 7 is timely removed from the unloading station, the projection 102 will be cleared and the spring 97 will bias the rod 94 back to its rearmost position where the switch actuator 96 is removed from the path of switch 92 and the washing unit will continue its operation.

If the tray 7 is not timely removed from the unloading station to allow the spring 97 to return the rod 94 to its rearmost position, the switch actuator 96 will remain in its forward position in the path of switch 92. In this event, switch 92 carried by arm 81 will engage the switch opening actuator 96 when the cam follower 83 reaches the valley between dwell lobe 89 and lobe 90 of cam 80 as shown in FIG. 11 to stop the unit. As described hereinbefore, carriages 55 in the immersion stations 3–5 are fully immersed when the follower 83 enters the valley between dwell lobe 89 and lobe 90 of cam 80. Thus, when the washing unit is stopped, the trays of glasses, if any, at the several immersion stations 3–5 will be fully immersed in their respective solutions. As a result, formation of a cloudy film on the glasses, as would generally occur if the alkali soaked glasses were allowed to dry in air between stations of the washing unit, is thereby prevented.

The washing unit further includes means for manually effecting shut off. A rotatable collar 103 is provided on the reciprocating rod 94 immediately to the rear of collar 101 which carries projection 102. Collar 103 carries a laterally projecting finger manipulator 104 which extends outwardly from the washing unit through an L-shaped opening 105 in the bracket 106 secured to the unit. To stop the machine, the operator moves the manipulator 104 horizontally in opening 105 to pull rod 94 forwardly against the bias of spring 97 and thereby place the switch actuator 96 in the path of switch 92. If desired or necessary, the collar 103 may be rotated on rod 94 to move the manipulator 104 vertically in opening 105 and thereby secure the rod 94 in the forward stop position. Since rod 94 may be manually placed in the forward stop position at any time as desired or required, the washing unit will stop as cam follower 83 enters any one of the three valleys in cam 80. Since carriages 55 in immersion stations 3–5 will be in their lowermost position when cam follower 83 enters any one of the valleys in cam 80, trays of glasses, if any, at the several stations will be fully immersed. The washing unit is again placed in service when the manipulator 104 is released within opening 105 to permit the rod 94 to return to its rearmost position and thereby move the switch opening actuator 96 out of contact with switch 92.

The invention thus provides a fully automatic soaker or immersion type washing unit which is particularly adapted for washing glasses and similarly shaped articles.

Various modes of carrying out the invention are contemplated as being within the scope of the following claims particularly pointing out and distinctly claiming the subject matter which is regarded as the invention.

We claim:

1. In an immersion type washer, a plurality of immersion stations intermediate a loading station and an unloading station, movable tray means for carrying the articles to be washed, said stations being adapted to simultaneously accommodate said tray means, support means for said tray means in each immersion station and being movable vertically to carry the tray means between a raised transfer position and a lowered immersion position, drive means for moving the support means vertically within the respective immersion stations, transfer means operable when the respective support means are in the raised position to move the tray means from any given station to the next succeeding station, drive means for the transfer means, the respective drive means for the support means and transfer means being operatively connected to perform in timed relation to provide a complete washing cycle for successive tray means from the loading station to the unloading station of the washer, and interlock means disposed between the respective drive means and being actuatable to stop the respective drive means by the arrival of tray means at the unloading station.

2. In an immersion type dish washer, a plurality of immersion stations intermediate a loading station and an unloading station, a basin at each immersion station, tray means for carrying the articles to be washed, said stations being adapted to simultaneously accommodate the tray means, support means for said tray means in each immersion station and being movable vertically to carry the tray means between a raised transfer position above the basins and a lowered immersion position, drive means for moving the support means vertically, transfer means operable when the respective support means are in the raised position to move the tray means from any given station to the next succeeding station, drive means for the transfer means, the respective drive means for the support means and transfer means being operatively connected to perform in timed relation to provide a complete washing cycle for successive tray means from the loading station to the unloading station of the washer, and interlock means disposed between the respective drive means and adapted to stop the respective drive means upon the arrival of tray means at the unloading station, said interlock means being rendered ineffective to stop the drive means when the tray means are timely removed at the unloading station.

3. The invention of claim 2 wherein the drive means for the vertically movable support means in the several immersion stations includes control means providing for agitation reciprocation of the support means within at least one immersion station during the immersion sequence.

4. The invention of claim 2 wherein the vertically movable support means at each immersion station includes means adapted to incline the tray means relative to the support means prior to immersion into the corresponding basin to substantially prevent glasses and the like from floating out of the tray means upon immersion of the latter.

5. The invention as set forth in claim 2 wherein the drive means for moving the support means vertically includes a rotatable cam element contoured to provide for agitation reciprocation of the immersed support means within the respective basins.

6. The invention of claim 2 wherein the interlock means disposed between the respective drive means includes means to provide that the washer stop only when the vertically movable support means together with tray means thereon, if any, are immersed in the respective immersion stations.

7. The invention of claim 2 wherein the vertically movable support means within each immersion station comprises a carriage member having a generally horizontal upper surface adapted to receive and support the tray means in the uppermost position of said member and said member includes lifting means movable relative to said member, said lifting means being adapted to raise an edge of the tray means upwardly to incline the tray means relative to said carriage member prior to immersion within the corresponding basin so that the carrier means is immersed in the tilted position.

8. The invention of claim 2 wherein the tray means for the articles to be washed include support surfaces which slant downwardly in a given direction to provide for drainage of glasses and the like and wherein the vertically movable support means within each immersion station have a generally horizontal upper surface adapted to receive and support said tray means in the uppermost position thereof, and means on the support means and pivotable relative thereto, said pivotal means being adapted to raise the edge of the tray means corresponding to the given direction and tilt the tray means relative to the upper surface of the support means prior to immersion within the corresponding basin to substantially reduce the slant angle of the support surfaces of the tray means during immersion.

9. The invention of claim 2 wherein the vertically movable support means within each immersion station comprises a carriage member having a generally horizontal upper surface adapted to receive and support the tray means in the uppermost position of said member and said member includes tilting means pivotable relative to said member, said tilting means being adapted to raise an edge of the tray means upwardly to tilt the tray means relative to said carriage member when the carriage member moves vertically within the corresponding immersion station, and means in said immersion station and engageable by said tilting means to render said tilting means inoperative in the uppermost position of the carriage member.

10. In an immersion type dish washer having a plurality of immersion stations intermediate a loading station and an unloading station, a basin at each immersion station, tray means for carrying the articles to be washed, support means for said tray means in each immersion station and having a generally horizontal upper surface and being movable vertically to carry the tray means between a raised transfer position above the basins and a lowered immersion position, a member pivotally connected to the support means and normally engageable with the tray means to incline the tray means relative to the support means, drive means for moving the support means vertically, stop means on the wall of each basin and engageable by the pivotal member when the corresponding support means approaches its raised position to provide for movement of the support means relative to the pivotal member and thereby seat the tray means on the upper surface of the support means, transfer means operable when the respective support means are in the raised position to move the tray means from any given station to the next succeeding station, and drive means for the transfer means, the respective drive means for the support means and transfer means being operatively connected to perform in timed relation to provide a complete washing cycle for successive tray means from the loading station to the unloading station of the washer.

11. The invention as set forth in claim 10 wherein interlock means are disposed between the respective drive means and are adapted to stop said drive means upon the arrival of tray means at the unloading station, said interlock means being rendered ineffective to stop the drive means when the tray means are timely removed at the unloading station.

12. The invention as set forth in claim 10 wherein the drive means for moving the support means vertically includes a rotatable cam element, a motor driving said cam element, and a pivotal follower arm controlled by the cam element and carrying a motor stop switch; and wherein a member is movably supported adjacent to the unloading station of the washer and is engageable by tray means when approaching the unloading station; actuating means for the motor stop switch carried by said member; and spring means normally biasing said member against the direction of travel of the tray means and maintaining the switch actuating means out of the path of the motor stop switch; said member being movable against the bias of the spring means by tray means moving into the unloading station to place the switch actuating means in the path of the motor stop switch to thereby stop the motor unless the tray means are timely removed permitting said member to return the switch actuating means to the position out of the path of the motor stop swich.

References Cited by the Examiner

UNITED STATES PATENTS

| | | | |
|---|---|---|---|
| 724,734 | 4/03 | Pindstofte | 134—46 X |
| 1,285,272 | 11/18 | Lutolf | 134—76 X |
| 1,624,026 | 4/27 | Utz | 134—46 X |
| 1,739,404 | 12/29 | Lutolf | 134—164 X |
| 2,048,937 | 7/36 | Larson. | |
| 2,207,697 | 7/40 | Kendall | 134—46 |
| 2,408,248 | 9/46 | Barber | 134—46 X |
| 2,632,453 | 3/53 | Friedman | 134—165 X |
| 2,644,473 | 7/53 | Fox | 134—46 X |
| 2,764,170 | 9/56 | Messler | 134—46 |
| 2,851,044 | 9/58 | Davis | 134—83 X |
| 2,853,084 | 9/58 | Lipshaw | 134—76 |

CHARLES A. WILLMUTH, *Primary Examiner.*

G. J. NORTH, *Examiner.*